US011943623B2

(12) United States Patent
Jemili et al.

(10) Patent No.: US 11,943,623 B2
(45) Date of Patent: Mar. 26, 2024

(54) ELECTRONIC APPARATUS, SYSTEM FOR WIRELESS INFORMATION EXCHANGE, AND METHOD FOR COUPLING TWO APPARATUSES

(71) Applicant: Robert Bosch GmbH, Stuttgart (DE)

(72) Inventors: Amin Jemili, Kusterdingen (DE); Johannes Classen, Reutlingen (DE); Falk Roewer, Reutlingen-Betzingen (DE); Gregor Wetekam, Reutlingen (DE); Ruslan Khalilyulin, Munich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 83 days.

(21) Appl. No.: 17/647,621

(22) Filed: Jan. 11, 2022

(65) Prior Publication Data

US 2022/0248232 A1 Aug. 4, 2022

(30) Foreign Application Priority Data

Feb. 2, 2021 (DE) ..................... 10 2021 200 920.4

(51) Int. Cl.

*H04W 12/50* (2021.01)
*H04W 12/63* (2021.01)
*H04W 12/65* (2021.01)

(52) U.S. Cl.

CPC ........... *H04W 12/50* (2021.01); *H04W 12/63* (2021.01); *H04W 12/65* (2021.01)

(58) Field of Classification Search

CPC ...... H04W 12/50; H04W 12/63; H04W 12/65
See application file for complete search history.

(56) References Cited

U.S. PATENT DOCUMENTS 8,646,060 B1 * 2/2014 Ben Ayed ............... H04W 4/20 726/9
8,909,194 B2 * 12/2014 Madhavan ............. H04L 67/14 455/457
9,374,841 B2 * 6/2016 Chang ................... G06F 21/445
9,674,700 B2 * 6/2017 John Archibald .... H04W 12/50
9,928,413 B2 * 3/2018 Baca ....................... G06F 21/00
10,657,242 B1 * 5/2020 Xia ....................... H04L 9/0825
10,855,664 B1 * 12/2020 Ziraknejad ............. H04W 4/02
11,140,157 B1 * 10/2021 Xia ..................... H04L 63/0853
11,184,766 B1 * 11/2021 Lord ...................... G06V 10/75
11,657,132 B2 * 5/2023 Tussy ................. G06Q 20/3276 726/6
2010/0167646 A1 7/2010 Alameh et al.
2011/0314153 A1 12/2011 Bathiche et al.
2012/0050153 A1 3/2012 Dvortsov et al.
2012/0077436 A1 * 3/2012 Konded .............. G06F 3/04883 345/173
2014/0120956 A1 * 5/2014 Chung .................. H04W 4/026 455/456.6

(Continued)

FOREIGN PATENT DOCUMENTS

DE 102014224133 A1 1/2016
DE 102017100017 A1 3/2018

*Primary Examiner* — Hai V Nguyen
(74) *Attorney, Agent, or Firm* — NORTON ROSE FULBRIGHT US LLP; Gerard A. Messina

(57) ABSTRACT

A coupling of two electronic apparatuses for a wireless information exchange. The coupling is authenticated through the evaluation of motion patterns previously executed by the apparatuses.

11 Claims, 3 Drawing Sheets first apparatus

1

2

(56) References Cited

U.S. PATENT DOCUMENTS

| | | | | |
|---|---|---|---|---|
| 2014/0148094 | A1* | 5/2014 | Park | H04B 5/00 455/41.1 |
| 2015/0003693 | A1* | 1/2015 | Baca | G06F 21/00 382/124 |
| 2015/0024678 | A1* | 1/2015 | Chang | H04W 76/14 455/39 |
| 2016/0063235 | A1* | 3/2016 | Tussy | G06V 40/67 726/6 |
| 2016/0127900 | A1* | 5/2016 | John Archibald | G06F 21/32 726/7 |
| 2019/0080157 | A1* | 3/2019 | Lev | G07C 9/28 |
| 2019/0303551 | A1* | 10/2019 | Tussy | G06V 40/67 |
| 2020/0233949 | A1* | 7/2020 | Xia | H04W 12/08 |
| 2022/0058251 | A1* | 2/2022 | Shin | G06F 21/45 |
| 2023/0214470 | A1* | 7/2023 | Tily | G06F 21/32 726/17 |

* cited by examiner

ELECTRONIC APPARATUS, SYSTEM FOR WIRELESS INFORMATION EXCHANGE, AND METHOD FOR COUPLING TWO APPARATUSES

CROSS REFERENCE

The present application claims the benefit under 35 U.S.C. § 119 of German Patent Application No. DE 10 2021 200 920.4 filed on Feb. 2, 2021, which is expressly incorporated herein by reference in its entirety.

FIELD

The present invention relates to a method for coupling two apparatuses. The present invention further relates to an electronic apparatus and to a system for wireless information exchange.

BACKGROUND INFORMATION

For many years there has existed the trend to link individual apparatuses with one another via wireless radio links. For example, in so doing the apparatuses can communicate with one another via Bluetooth or another low-power radio standard. For a protected and secure link between the apparatuses, it can be required to first couple the individual apparatuses with one another on first use.

German Patent Application No. DE 10 2014 224 133 A1 describes a method and a device for registering a new Bluetooth apparatus. In this context, it is proposed to initiate an automated Bluetooth link procedure, when a main unit of a motor vehicle is supplied with current.

SUMMARY

The present invention provides a method for coupling a first apparatus with a second apparatus, an electronic apparatus, and a system for wireless information exchange. Further advantageous embodiments are disclosed herein.

In accordance with an example embodiment of the present invention, there is provided:

A method for coupling a first apparatus with a second apparatus. The method comprises a step for detecting a motion pattern of the first apparatus and a step for transmitting information concerning the detected motion pattern of the first apparatus to the second apparatus. The method additionally comprises a step for detecting a motion pattern of the second apparatus. The method further comprises a step for comparing the detected motion pattern of the second apparatus with the transmitted information of the motion pattern of the first apparatus and for checking a predetermined coupling condition. In particular, the checking of the predetermined coupling condition takes place using the comparison of the detected motion pattern of the second apparatus with the transmitted information of the motion pattern of the first apparatus. The method further comprises a step for activating a coupling for a radio link between the first apparatus and the second apparatus in the event that the predetermined coupling condition is satisfied.

In accordance with an example embodiment of the present invention, there is further provided:

An electronic apparatus including a motion sensor and a communication module. The motion sensor is configured to detect a motion pattern of the electronic apparatus in space. The communication module is configured to receive information of a motion pattern of a further apparatus in space.

The communication module is further configured to compare the motion pattern detected by the motion sensor with the received information of the motion pattern of the further apparatus. The communication module is further configured to check a predetermined coupling condition. In particular, the communication module may check the predetermined coupling condition using the comparison of the detected motion pattern with the received information of the further motion pattern of the further apparatus. Moreover, the communication module is configured to activate a coupling for a radio link between the communication module and the further apparatus in the event that the predetermined coupling condition is satisfied.

In accordance with an example embodiment of the present invention, there is provided:

A system for wireless information exchange including a first electronic apparatus according to the invention and a further electronic apparatus. The further electronic apparatus comprises a motion sensor and a communication module. The motion sensor of the further electronic apparatus is configured to detect a motion pattern of the further electronic apparatus in space. The communication module of the further electronic apparatus is configured to transmit information of the detected motion pattern from the further apparatus. In particular, the information of the motion pattern may be transmitted from the further apparatus to the first electronic apparatus.

The present invention is based on the insight that before setting up a wireless communication link between two apparatuses, first a coupling between the two apparatuses takes place. Once two apparatuses have been coupled with one another, at a later point in time, a radio link may be set up between the two apparatuses on the basis of this coupling. During the coupling itself, however, it has to be ensured with a high degree of certainty that always the correct apparatuses authenticate themselves against each other.

It is, therefore, feature of an example embodiment of the present invention to take into account of this insight and to offer a method for the coupling of two apparatuses which is secure, reliable, and at the same time also as simple as possible to apply. To this end, it is provided to move the apparatuses to be coupled in three-dimensional space during the coupling procedure and to analyze these motion patterns for the coupling procedure.

The moving of the electronic apparatuses in space presents to a user an especially simple to realize task. Moreover, it is also especially easy for the user to move together the two apparatuses that are to be coupled. In this way, the two motion patterns of the apparatuses to be coupled may be correlated with one another. This makes possible especially reliable identification of the two apparatuses to be coupled. For example, the two apparatuses to be coupled may be moved together with one another, such that the two apparatuses execute the same movement simultaneously. Alternatively, the two apparatuses may for example be lightly tapped against each other, such that at the time of the two apparatuses striking one another there likewise ensues an unambiguously identifiable motion pattern of the two apparatuses. But arbitrary other suitable motion patterns are of course also possible for the two apparatuses in order to identify and authenticate the two apparatuses against each other.

Besides the pure coupling of two apparatuses with one another it is, moreover, for example also possible that during the coupling of the two apparatuses, at the same time a coupling and/or existing radio link respectively to a further apparatus is cancelled. Alternatively, during a coupling of two apparatuses with one another this coupling information may be added as a supplementary coupling to a list of further, already existing couplings.

According to one specific embodiment of the present invention, the checking of the predetermined coupling condition comprises a checking of a temporal relationship between the detected motion pattern of the first apparatus and the detected motion pattern of the second apparatus. For example, the two detected motion patterns may be correlated with one another. For example, it is possible to check whether patterns may be identified at least partially in the two detected motion patterns which have occurred simultaneously in the two detected motion patterns. If, for example, the two apparatuses to be coupled are held by a user in the same hand and moved together with each other, then the same movements may be detected at the same time in both detected motion patterns. When striking together the two apparatuses to be coupled, too, at least at the point in time of the collision, events that correlate with one another may be detected at the same time in both motion patterns.

According to one specific embodiment of the present invention, the checking of the predetermined coupling condition comprises a computation of a correlation, in particular a temporal correlation, between the detected motion pattern of the first apparatus and the detected motion pattern of the second apparatus. Here the activation of the coupling takes place only when the computed correlation exceeds a predetermined threshold. In particular, the coupling between the two apparatuses can only take place if an especially strong correlation of the two motion patterns has been detected. For example, a threshold value may be defined which corresponds to a correlation of nearly 100%, for example at least 95%, 90%, 80% (corresponding to approximately 1.0, at least 0.95, 0.9, or 0.8) or another suitable threshold value. In this way it may be ensured that the two apparatuses are moved simultaneously with one another. In order to also detect, where appropriate, opposite movements of the two apparatuses, for example to detect the two apparatuses striking or tapping one another, it is also possible to compare only the magnitude of the correlation with a threshold value, or to explicitly consider a negative threshold correlation, which in this case then has to fall below a specified threshold value.

According to one specific embodiment of the present invention, the activation of the coupling between the two apparatuses takes place irrespective of a temporal correlation of the detected motion pattern of the first apparatus and of the detected motion pattern of the second apparatus. In this way, a coupling of the two apparatuses with one another may also be realized without direct contact or exact simultaneous movement of the two apparatuses having to take place here.

According to one specific embodiment of the present invention, the checking of the predetermined coupling condition comprises a checking for directionally aligned or opposite motion patterns between the detected motion pattern of the first apparatus and the detected motion pattern of the second apparatus. For example, as already explicated above, similarities may be identified in the two detected motion patterns when the two apparatuses are moved by a user in the same hand. Alternatively, however, a user may also for example move one after the other first one and then the other apparatus with the same motion pattern in space. It is precisely when one and the same user moves the two apparatuses to be coupled one after the other that he executes, with a high degree of certainty, the same or at least very similar motion patterns. Furthermore, for example, it is precisely during the striking together of the two apparatuses to be coupled that opposite patterns may be present in the two motion patterns, when the two apparatuses to be coupled move towards each other and then are moved away again from each other. The two apparatuses to be coupled may be identified with a high degree of certainty through such motion patterns.

According to one specific embodiment of the present invention, the checking of the predetermined coupling condition comprises a comparison of the detected motion pattern of the first apparatus and/or of the detected motion pattern of the second apparatus with a predetermined motion pattern. For example, a motion pattern that is required for the coupling procedure may be previously communicated to a user. For example, the motion pattern to be executed may be affixed onto the apparatus to be coupled or be supplied in a further accompanying document, for example the operating instructions. This motion pattern to be executed may, for example, be stored in the apparatus to be coupled or in the apparatus with which the apparatus to be coupled has to be coupled. For example, the motion pattern may comprise a circling movement, a rotating movement, a shaking, or tapping, or an arbitrary other specified motion pattern.

According to one specific embodiment of the present invention, the method further comprises a step for receiving authentication information in the second apparatus. In this case, the coupling of the radio link between the first apparatus and the second apparatus can only be activated if the received authentication information agrees with a specified condition. The authentication information received by the second apparatus may be arbitrary suitable authentication information. In particular, the authentication information may be output by the first apparatus. For example, the first apparatus may emit an optical and/or acoustic signal. This signal emitted by the first apparatus may be received by an appropriate receiver in the second apparatus. In this way, it may be additionally ensured that the coupling indeed takes place between the two correct apparatuses. It is, however, also possible that information is affixed onto the first apparatus which may be perceived by a user. For example, a numerical code or similar may be printed on the first apparatus. Accordingly, an input element may be provided at the second apparatus on which the user performs an input which corresponds to the information indicated on the first apparatus. For example, by way of a push button or similar a suitable sequence of key-press pulses or similar may be input. Of course, other arbitrary options for exchanging authentication data between the first apparatus and the second apparatus are also possible.

According to one specific embodiment of the present invention, the activation of the coupling for the radio link comprises a step for deactivating an already existing coupling for a radio link between the second apparatus and a further apparatus. Alternatively, the coupling of the radio link may comprise a step for adding the coupling between the first apparatus and the second apparatus to existing further couplings between the first apparatus and one or several further apparatuses. If, for example, an audio source such as for example an MP3 player is to be coupled with a playback apparatus, such as for example a loudspeaker, then for example it may be desirable that the playback always takes place only on one playback apparatus. In this case, a previously already existing link to another playback source may be disconnected before the coupling with the new playback source takes place.

According to one embodiment of the present invention, the first apparatus and/or the second apparatus may comprise a processing device which is configured to compare the detected motion pattern with a predetermined motion pattern. Accordingly, this information concerning the comparison of the detected motion pattern with predetermined motion patterns may be used for the further processing within the coupling process. For example, the information concerning a successful (or unsuccessful) detection of a predetermined motion pattern may also be transmitted to the apparatus to be coupled. In this way, the quantity of data to be transmitted may be minimized. Moreover, the processing devices make possible an especially efficient and resource-conserving evaluation of the motion patterns inside the respective apparatuses.

According to one specific embodiment of the present invention, the communication modules of the first electronic apparatus and of the second electronic apparatus comprise a Bluetooth radio module. Accordingly, the coupling between the two apparatuses may involve coupling for a Bluetooth radio link.

The above configurations and further developments may, insofar as reasonable, be combined arbitrarily with one another. Further configurations, further developments, and implementations of the invention also comprise combinations not mentioned explicitly of features of the present invention described above or hereinafter in relation to the embodiment examples. In particular, a person skilled in the art will also add individual aspects as improvements or supplements to the respective basic forms of the present invention, in view of the disclosure herein.

BRIEF DESCRIPTION OF THE DRAWINGS

Further features and advantages of the present invention are elucidated below by reference to the figures.

DETAILED DESCRIPTION OF EXAMPLE EMBODIMENTS

Figure 1:
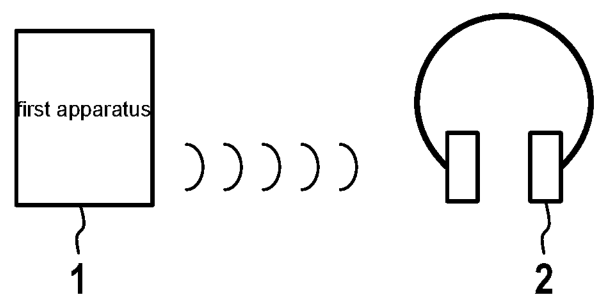
FIG. 1 shows a schematic depiction of wireless communication between two coupled apparatuses according to one specific example embodiment of the present invention.

FIG. 1 shows a schematic depiction of a wireless communication link between a first apparatus 1 and a second apparatus 2. The first apparatus 1 and the second apparatus 2 may in principle be arbitrary apparatuses which communicate with one another by way of a wireless communication link, such as for example Bluetooth or another low-power radio link. For example, this may involve an audio source such as for example an MP3 player, in particular a smartphone or similar, which transmits the audio data as radio signals to a playback apparatus, for example a loudspeaker or a headphone. It should be understood, however, that the present invention is not restricted to radio links for audio transmission, but rather is applicable to arbitrary data transmissions.

In order to ensure that the data are exchanged between the correct, authorized apparatuses, before the first setting up of the data link the two apparatuses 1, 2 are coupled with one another. In this process, the second apparatus 2 authenticates itself towards the first apparatus 1 (or vice versa). After successful coupling between two apparatuses, at a later point in time a data link may be set up automatically between the two apparatuses as soon as the two apparatuses 1, 2 are situated within radio range of one another and are switched on.

If, for example in the example instanced above of an audio source and a playback apparatus, several playback apparatuses are within radio range of the audio source, the audio source will link with the first available or identified playback apparatus. If, however, the audio playback is to take place over another playback apparatus, the possibly automatically established link to the original playback apparatus has to be disconnected and subsequently a new link established to the desired playback apparatus. To this end, it has to be possible to identify the individual apparatuses against each other securely and reliably.

Figure 2:
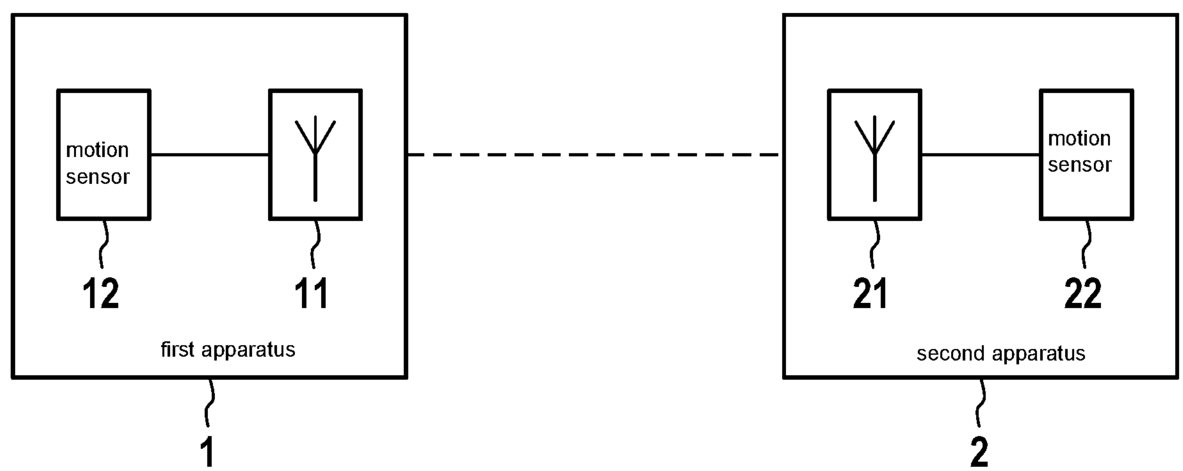
FIG. 2 shows a schematic depiction of a block diagram of a system for wireless information exchange between an electronic apparatus and a further apparatus, according to an example embodiment of the present invention.

FIG. 2 shows a schematic depiction of a block diagram of a system for wireless information exchange between two apparatuses 1, 2. A first apparatus 1 comprises a communication module 11 for sending and receiving radio signals. The first apparatus 1 further comprises a motion sensor 12. The motion sensor 12 may be an arbitrary suitable component which is able to detect movements, in particular movements of the first apparatus 1 in three-dimensional space. For example, the motion sensor 12 may detect the movement by way of an acceleration sensor, a magnetic field sensor, a gyroscope, or the like. The motion sensor 12 may thereupon provide sensor data which correspond to the detected movements of the first apparatus 1. These sensor data may be transmitted by way of the communication module 11 to the second apparatus 2.

Alternatively, the motion sensor 12 may also process the detected movement and provide the result of this processing to the communication module 11 for transmission to the second apparatus 2. For example, information such as maximum and/or minimum acceleration within a predetermined time interval, information concerning spatial positions at predetermined points in time and/or within certain time intervals, or arbitrary other suitable information may be ascertained and provided. Furthermore, the motion sensor 12 may also compare the ascertained motion patterns with predetermined motion patterns, for example motion patterns stored in the motion sensor 12 and provide the result of this comparison to the communication module 11. For example, the motion sensor 12 may identify a specified motion pattern and output an appropriate signal when this motion pattern has been identified. In principle, it is also possible for one of several specified motion patterns to have been identified by the motion sensor 12 and, if indicated, also for information about the respectively identified motion pattern to be provided to the communication module 11.

The second apparatus 2 may likewise comprise a communication module 21 and a motion sensor 22. The communication module 21 may for example receive the information concerning the motion pattern of the first apparatus 1 sent out by the communication module 11 of the first apparatus 1.

The motion sensor 22 of the second apparatus 2 may detect a movement of the second apparatus 2 and provide appropriate sensor data. Alternatively, the second motion sensor 22 may also compare the detected motion pattern of the second apparatus 2 with one or several predetermined motion patterns and provide appropriate information concerning an identified previously stored motion pattern.

Such predetermined motion patterns may, for example, comprise a circling movement, a rotation of the apparatus, a figure eight movement or similar, a shaking of the apparatus, or an identification of tapping movements, or similar. Of course, arbitrary other suitable predetermined motion patterns are also possible.

Once the radio module 21 of the second apparatus 2 has received information concerning the motion pattern of the first apparatus 1, the received information of the motion pattern of the first apparatus may be compared in the second apparatus 2 with a detected motion pattern of the second apparatus. For example, this comparison may take place within the communication module 21 of the second apparatus. Furthermore, in principle the comparison may also take place in a separate control unit or similar.

If a relationship is identified between the motion pattern of the first apparatus 1 and the detected motion pattern of the second apparatus 2, then a coupling, for example an authentication, may thereupon take place between the first apparatus 1 and the second apparatus 2. The first apparatus 1 may authenticate itself against the second apparatus 2 through such coupling. Subsequently, it is possible for a data exchange to take place between the first apparatus 1 and the second apparatus 2.

If the second apparatus 2 has previously set up a data link with a further apparatus (not depicted here), then this data link may be terminated once a match has been detected through the comparison of the motion patterns of the first apparatus 1 and of the second apparatus 2. Alternatively, after detecting a match in the motion patterns, the coupling between the first apparatus 1 and the second apparatus 2 may be added to the already existing further couplings.

Figure 3:
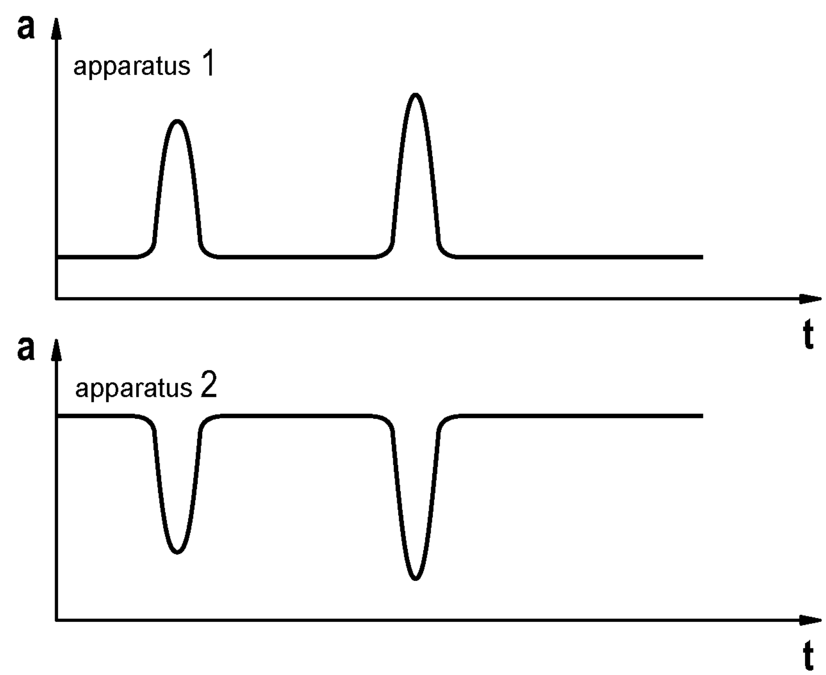
FIG. 3 shows a schematic depiction of detected motion patterns for a coupling procedure in accordance with a further example embodiment of the present invention.

For coupling the two apparatuses 1, 2, the two apparatuses 1, 2 may for example be taken by a user in the same hand and thus moved together with one another. In this way the motion sensors 12, 22 of the first and second apparatus 1, 2 may simultaneously detect the same motion pattern. If, therefore, it is established in the second apparatus 2 that the two detected motion patterns match both temporally and in their form, then a coupling between the two apparatuses 1, 2 may thereupon take place. Alternatively, other types of motion patterns are also possible. For example, it is also possible that the two apparatuses to be coupled 1, 2 are tapped against one another. Accordingly, the two apparatuses 1, 2 will first execute opposite movements, or one of the two apparatuses remains at its spatial position while the other apparatus is moved towards this apparatus. At the point in time of the tapping against each other, an acceleration may then be detected by each of the motion sensors 12, 22, wherein the acceleration exhibits an opposite sign in at least one spatial direction. Such a motion pattern is depicted as an example in FIG. 3.

Figure 4:
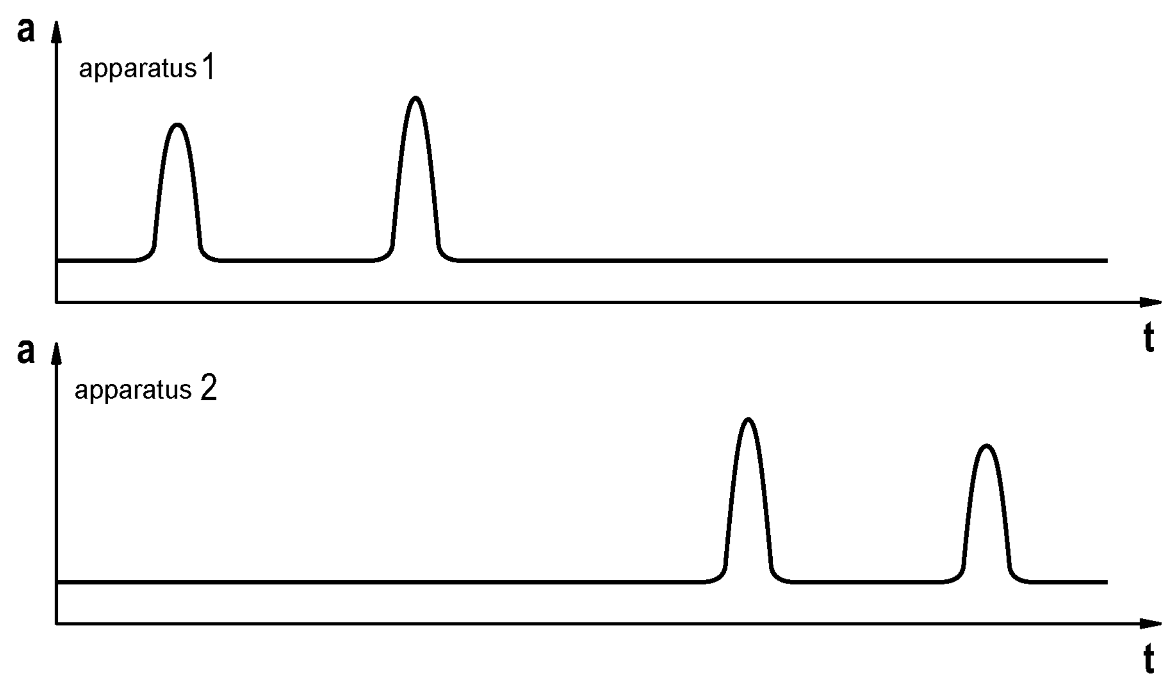
FIG. 4 shows a schematic depiction of detected motion patterns for a coupling procedure in accordance with a further example embodiment of the present invention.

Moreover, it is also possible that for example first one of the two apparatuses 1, 2 and subsequently the other apparatus is moved by the user one after the other. In so doing, the user may execute at least approximately the same movement with both apparatuses. For example, a user may first move the first apparatus 1 and subsequently execute the same movement with the second apparatus 2. In this case, the two motion patterns may be compared with one another, wherein a temporal offset between the two detected motion patterns is permissible. Such a course of motion patterns is depicted for example in FIG. 4.

Moreover, of course arbitrary other types of motion patterns are also possible. For example, previously firmly specified motion patterns may be executed by a user for the coupling, which for example are indicated by way of a text label on the respective apparatuses, or which are specified by way of a separate medium, for example the operating instructions or similar.

Furthermore, it is also possible that the first and/or second apparatus is initially in a standby or passive mode, and the respective apparatus is only activated by a predetermined motion pattern in order to initiate a subsequent checking of the motion patterns for a coupling procedure. Moreover, in the individual apparatuses 1, 2 too, different motion patterns may be specified which have to be identified during the coupling procedure.

Moreover, it is also possible to further increase the reliability of a coupling procedure by checking additional authentication information. For example, further authentication information may be output by the first apparatus 1 by way of a suitable transmitting element. These further authentication information may be received by an appropriate receiver in the second apparatus 2. For example, the first apparatus 1 may emit an acoustic and/or optical signal, which is received and checked by the second apparatus 2.

Figure 5:
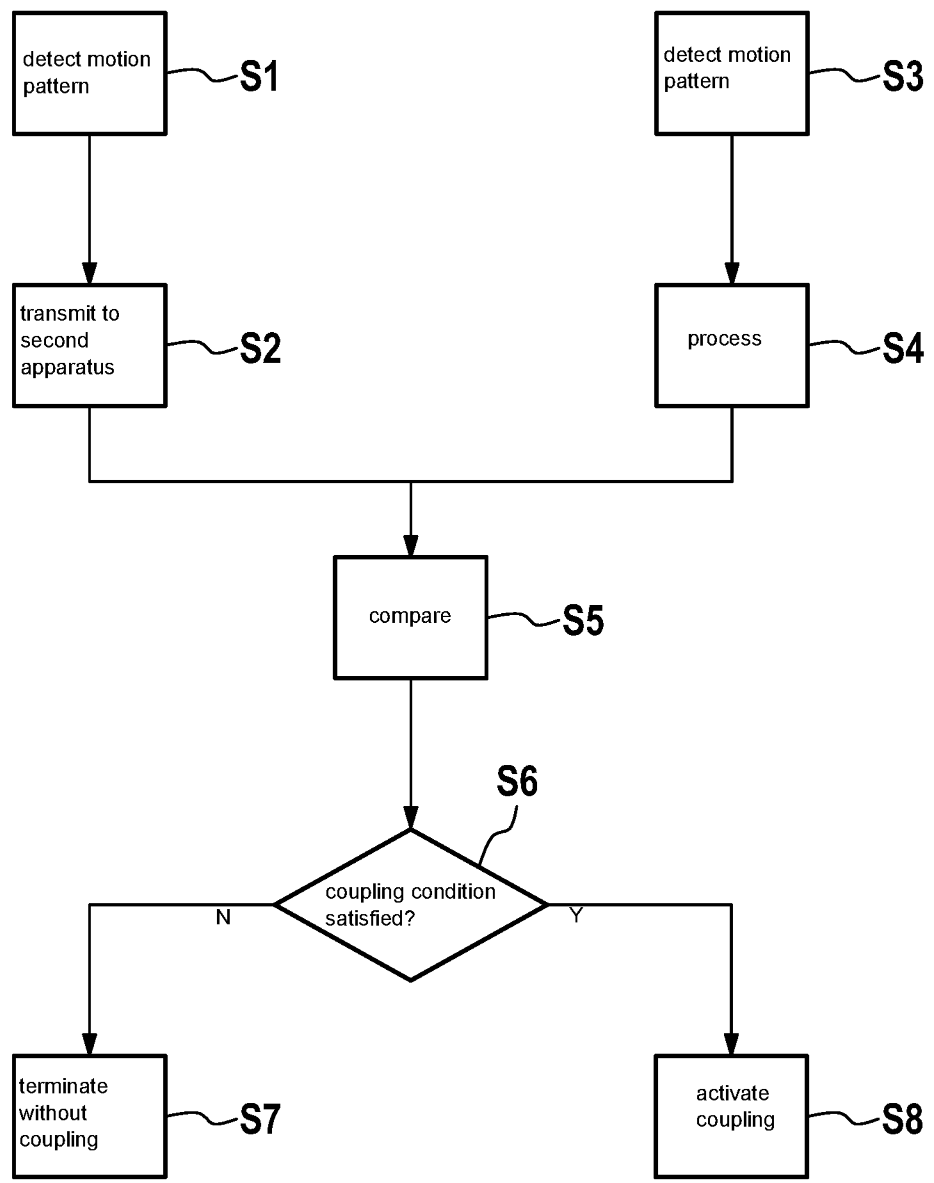
FIG. 5 shows a flowchart underlying a method for coupling two apparatuses according to one specific example embodiment of the present invention.

FIG. 5 shows a flowchart underlying a method for coupling two electronic apparatuses according to one specific embodiment. In step S1, a motion pattern may be detected in a first apparatus 1. This detected motion pattern or information which characterizes the detected motion pattern, may in step S2 be transmitted to a second apparatus 2. In step S3, a motion pattern may be detected in the second apparatus 2. This detected motion pattern may possibly already be processed in step S4. For example, the detected motion pattern of the second apparatus 2 may be compared with one or several predetermined motion patterns.

In step S5 there takes place a comparison of the detected motion pattern of the first apparatus 1 or information, which characterizes this detected motion pattern, with the detected motion pattern of the second apparatus and/or respectively with information which characterizes this motion pattern of the second apparatus.

In step S6 there takes place a check as to whether the detected motion pattern of the first apparatus and the detected motion pattern of the second apparatus satisfy a predetermined coupling condition in accordance with the previously performed comparison. If the predetermined coupling condition is not satisfied, then the method is terminated in step S7 without a coupling taking place. If, on the contrary, the predetermined coupling condition is satisfied, then in step S8 a coupling between the two apparatuses 1, 2 may be activated.

In summary, the present invention relates to a coupling of two electronic apparatuses for a wireless information exchange. In particular, the coupling is authenticated through the evaluation of motion patterns previously executed by the apparatuses.

What is claimed is:

1. A method for coupling a first apparatus with a second apparatus, comprising the following steps:

detecting a motion pattern of the first apparatus;

transmitting information concerning the detected motion pattern of the first apparatus to the second apparatus;

detecting a motion pattern of the second apparatus;

comparing the detected motion pattern of the second apparatus with the transmitted information of the motion pattern of the first apparatus;

checking a predetermined coupling condition based on the comparison of the detected motion pattern of the second apparatus with the transmitted information of the motion pattern of the first apparatus; and activating a coupling for a radio link between the first apparatus and the second apparatus based on the predetermined coupling condition being satisfied, wherein the checking of the predetermined coupling condition includes checking a temporal relationship between the detected motion pattern of the first apparatus and the detected motion pattern of the second apparatus, wherein the checking of the temporal relationship includes checking whether patterns identified at least partially in the two detected motion patterns have occurred simultaneously in the two detected motion patterns.

2. A method for coupling a first apparatus with a second apparatus, comprising the following steps:

detecting a motion pattern of the first apparatus;

transmitting information concerning the detected motion pattern of the first apparatus to the second apparatus;

detecting a motion pattern of the second apparatus;

comparing the detected motion pattern of the second apparatus with the transmitted information of the motion pattern of the first apparatus;

checking a predetermined coupling condition based on the comparison of the detected motion pattern of the second apparatus with the transmitted information of the motion pattern of the first apparatus; and activating a coupling for a radio link between the first apparatus and the second apparatus based on the predetermined coupling condition being satisfied, wherein the checking of the predetermined coupling condition includes computing a correlation between the detected motion pattern of the first apparatus and the detected motion pattern of the second apparatus, and wherein the activation of the coupling takes place only when the computed correlation exceeds a predetermined threshold value.

3. The method according to claim 1, wherein the activation of the coupling takes place irrespective of a temporal correlation of the detected motion pattern of the first apparatus and the detected motion pattern of the second apparatus.

4. The method according to claim 1, wherein the checking of the predetermined coupling condition includes checking for directionally aligned or opposite motion patterns between the detected motion pattern of the first apparatus and the detected motion pattern of the second apparatus.

5. The method according to claim 1, wherein the checking of the predetermined coupling condition includes comparing the detected motion pattern of the first apparatus and/or of the detected motion pattern of the second apparatus, with a predetermined motion pattern.

6. The method according to claim 1, further comprising the following steps:

receiving authentication information in the second apparatus;

wherein the coupling of the radio link between the first apparatus and the second apparatus is only activated when the received authentication information satisfies a specified condition.

7. The method according to claim 1, wherein the activation of the coupling for the radio link includes deactivating an existing coupling for a radio link between the second apparatus and a further apparatus or adding the coupling between the first apparatus and the second apparatus to a further coupling between the second apparatus and a further apparatus.

8. An electronic apparatus, comprising:

a motion sensor configured to detect a motion pattern of the electronic apparatus in space; and a communication module configured to receive information of a further motion pattern from a further apparatus, and wherein the communication module is further configured to:

compare motion patterns detected by the motion sensor with the received information of the further motion pattern, check a predetermined coupling condition based on the comparison of the detected motion pattern with the received information of the further motion pattern of the further apparatus, and activate a coupling for a radio link between the communication module and the further apparatus when the predetermined coupling condition is satisfied, wherein the checking of the predetermined coupling condition includes checking a temporal relationship between the detected motion pattern of the first apparatus and the detected motion pattern of the second apparatus, wherein the checking of the temporal relationship includes checking whether patterns identified at least partially in the two detected motion patterns have occurred simultaneously in the two detected motion patterns.

9. A system for wireless information exchange, comprising:

a first electronic apparatus including:

a motion sensor configured to detect a motion pattern of the electronic apparatus in space, and a communication module configured to receive information of a further motion pattern from a further apparatus, and wherein the communication module is further configured to:

compare motion patterns detected by the motion sensor with the received information of the further motion pattern, check a predetermined coupling condition based on the comparison of the detected motion pattern with the received information of the further motion pattern of the further apparatus, and activate a coupling for a radio link between the communication module and the further apparatus when the predetermined coupling condition is satisfied; and the further electronic apparatus, including:

a motion sensor configured to detect a motion pattern of the further electronic apparatus in space, and a communication module configured to transmit from the further apparatus information of the detected motion pattern of the further apparatus, wherein the checking of the predetermined coupling condition includes checking a temporal relationship between the detected motion pattern of the first apparatus and the detected motion pattern of the second apparatus, wherein the checking of the temporal relationship includes checking whether patterns identified at least partially in the two detected motion patterns have occurred simultaneously in the two detected motion patterns.

10. The system according to claim 9, wherein the motion sensor of the first electronic apparatus and/or of the further electronic apparatus includes a processing device which is configured to compare the detected motion pattern with at least one predetermined motion pattern.

11. The system according to claim 9, wherein the communication module of the first electronic apparatus and of the second electronic apparatus is a wireless communication module and each include a Bluetooth radio module.

* * * * *